(No Model.) 3 Sheets—Sheet 1.
F. PACZIGA.
RECTIFYING APPARATUS.
No. 369,877. Patented Sept. 13, 1887.
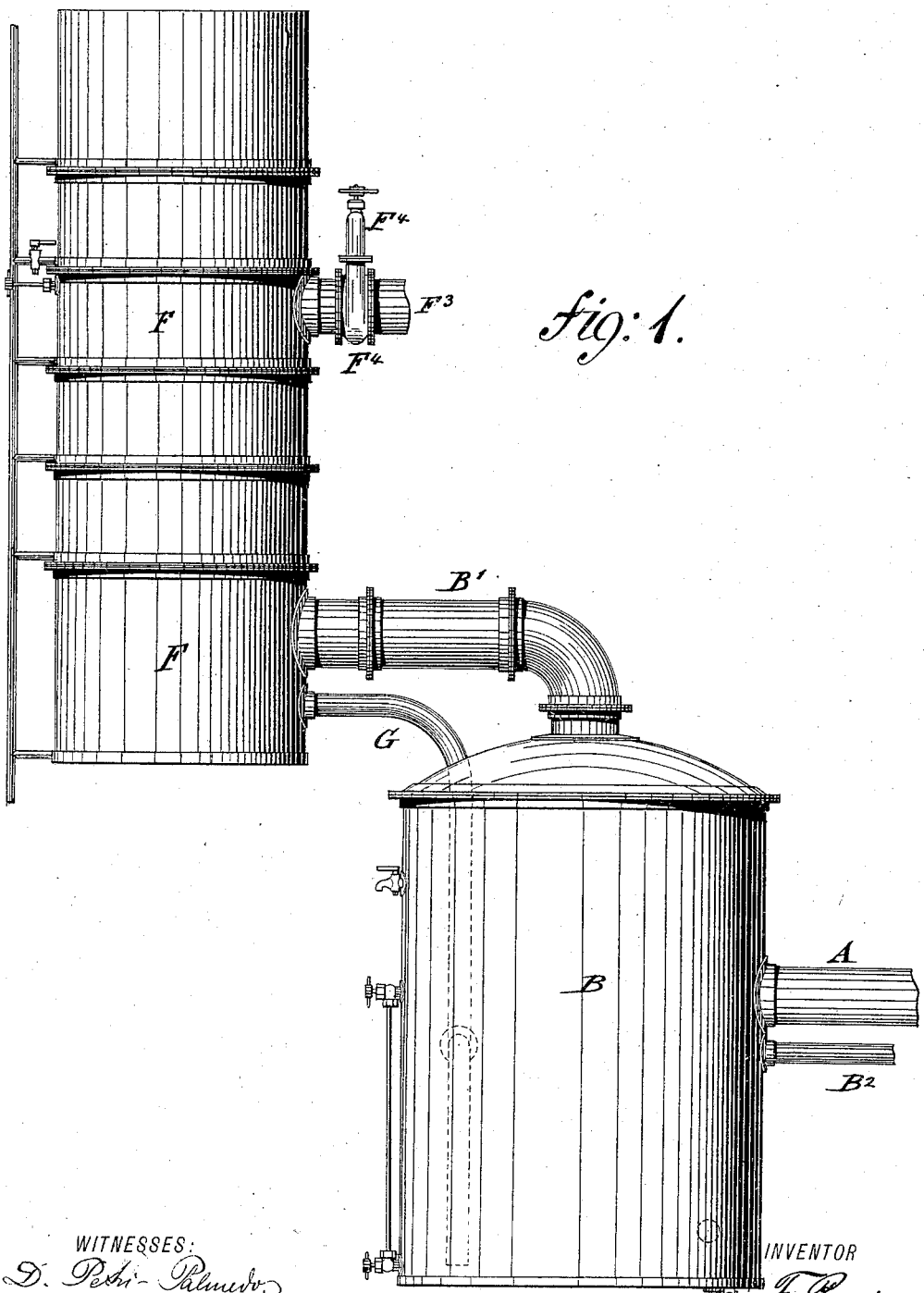

(No Model.) 3 Sheets—Sheet 2.
F. PACZIGA.
RECTIFYING APPARATUS.
No. 369,877. Patented Sept. 13, 1887.
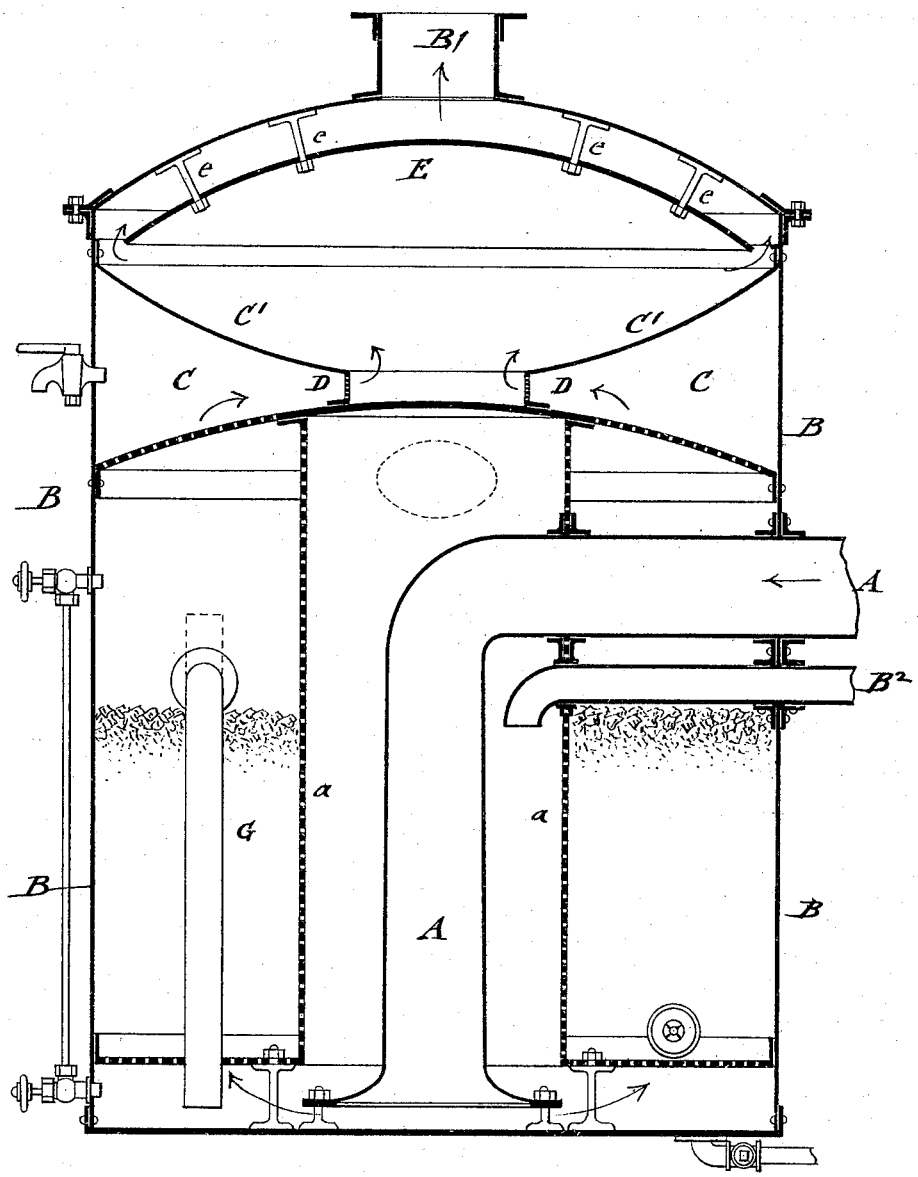
fig: 2.
WITNESSES:
INVENTOR
Franz Pacziga
BY
ATTORNEYS.

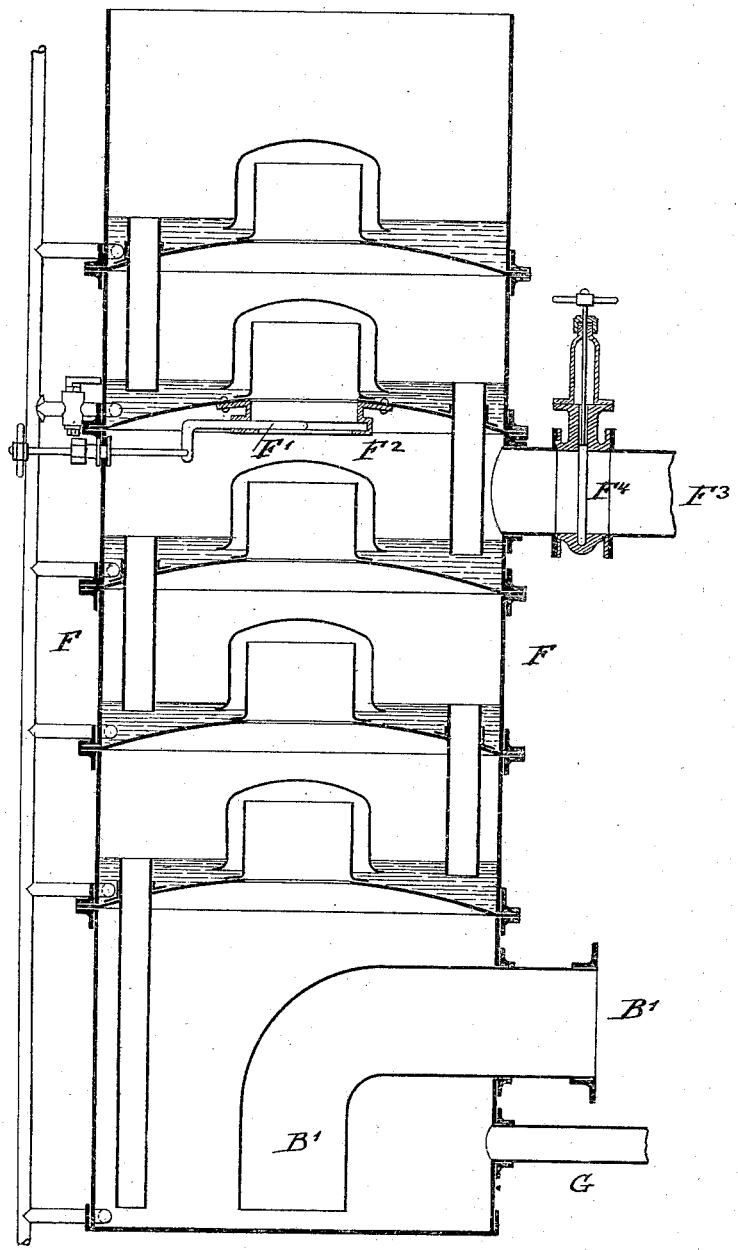
fig: 3.

UNITED STATES PATENT OFFICE.

FRANZ PACZIGA, OF EAST MILLSTONE, NEW JERSEY.

RECTIFYING APPARATUS.

SPECIFICATION forming part of Letters Patent No. 369,877, dated September 13, 1887.

Application filed March 3, 1887. Serial No. 229,521. (No model.)

*To all whom it may concern:*

Be it known that I, FRANZ PACZIGA, of East Millstone, in the county of Somerset and State of New Jersey, have invented certain new and useful Improvements in Rectifying Apparatus, of which the following is a specification.

This invention relates to improvements in rectifying apparatus for alcoholic liquors; and it consists of certain improvements in the charcoal-vapor filter and rectifying-column, as will be more fully described hereinafter, and finally pointed out in the claim.

In the accompanying drawings, Figure 1 represents a side elevation of a rectifying apparatus, showing the charcoal-vapor filter, a rectifying-column, and their connection. Fig. 2 represents a vertical central section of the charcoal-vapor filter of the rectifying apparatus; and Fig. 3, a vertical central section of the rectifying-column, the last two figures being drawn on a larger scale.

Similar letters of reference indicate corresponding parts.

In my improved rectifying apparatus the alcoholic vapors are conducted from the still through a large tube, A, to the center of the charcoal-vapor filter B, said tube A being turned downward and enlarged at the lower end, as shown in Fig. 2. The tube A is surrounded by a cylindrical body, a, which is formed of perforated sheet metal that is concentric to the casing or shell of the filter. Between the inner perforated wall, the wall of the filter, and the perforated bottom is packed a body of charcoal in small lumps.

The funnel-shaped lower end of the induction-tube A discharges the vapors below the perforated bottom of the charcoal-receptacle, said vapors being passed through the charcoal in upward direction and through the perforated top $a'$ of the charcoal-receptacle into an annular space, C, that is closed by a concave diaphragm, C', which is open at the center, said diaphragm forming, with the perforated top of the charcoal-receptacle and the central closed part of the top $a'$, a contracted throat, D, that is perforated at the inner wall for the for the passage of the vapors into the top part of the charcoal-vapor filter, as shown in Fig. 2. The narrow throat D, formed by the perforated top part of the charcoal-receptacle and the concave portion of the same, retards the passage of the alcoholic vapors through the charcoal, so as to bring the same thoroughly in contact with the same. The vapors, after having passed through the perforations of the narrow throat D, just described, impinge on a concave deflecting-plate, E, that is suspended by fixed bracket-arms $e$ from the top of the charcoal-vapor filter B, as shown in Fig. 2. The vapors pass around the deflecting-plate E and through the space between the same and the top of the filter B, and through a connecting-pipe, B', to a rectifying-column, F, of the usual construction, in which they are passed successively from one section to the other, and are thoroughly washed in their passage through the water in the same.

At some distance from the bottom of the column F is arranged, below the fourth or fifth section of the same, a horizontal valve, F', by which the passage of the vapors to the upper part of the rectifier can be interrupted. The valve F' is operated from the outside and guided in a suitable valve-frame, $F^2$, that is suspended from the diaphragm of said section of the column. When this valve F' is closed, the vapors are conducted through a lateral tube, $F^3$, of the column F to a suitable condenser, said tube being provided with a vertically-guided valve, $F^4$, that is opened when the horizontal valve F' is closed.

The rectifying-column F is used in the ordinary way during the first part of the distilling process, while during the latter part of the same, when the vapors contain fusel-oil and other impurities, the valve F' is closed and the valve $F^4$ opened, so that the vapors are conducted off through the tube $F^3$ to the condenser. The upper part of the rectifying-column F remains filled with spirits of a better quality and is not charged with spirits of inferior quality, so as to prevent intermingling, and produce thereby a better quality of alcoholic liquors. The rectifying-column F is further connected by a return-pipe, G, with the charcoal-vapor filter B, and the lower part of the latter with the still by a pipe, $B^2$, which pipes serve to return any impurities collected at the lower parts of the rectifying-column to the charcoal-vapor filter and from the same to the still.

My improved rectifying apparatus has the advantage that a higher degree of purification of the alcoholic vapors is obtained in the charcoal-vapor filter, and that means are provided by which the vapors containing fusel-oil are separately conducted off for condensation, so as not to mingle with and deteriorate the purer vapors that are passed through the column during the first part of the distilling process. The charcoal-vapor filter produces, in connection with the valves of the rectifying-column, a better result than can be obtained with the leaches and charcoal-filters heretofore in use, as the fusel oil and similar impurities are separated in a more perfect manner from the alcoholic vapors, and thereby spirits of a better quality obtained.

Having thus described my invention, I claim as new and desire to secure by Letters Patent—

A charcoal-vapor filter consisting of an outer casing or shell and a central chamber, a charcoal-receptacle supported between the outer wall of the filter and said central chamber, and provided with a perforated bottom and an inner concentric perforated wall, a conducting tube having a funnel-shaped lower end passing through an opening below said central chamber, and an annular chamber having a contracted eduction-throat above the charcoal-receptacle, and a deflecting-plate at the upper part of the receptacle, substantially as set forth.

In testimony that I claim the foregoing as my invention I have signed my name in presence of two subscribing witnesses.

FRANZ PACZIGA.

Witnesses:
SIDNEY MANN,
MARTIN PETRY.